(12) United States Patent
Regnier (10) Patent No.: US 10,481,787 B2
(45) Date of Patent: Nov. 19, 2019

(54) GRAPHICAL INTERFACE AND METHOD FOR MANAGING SAID GRAPHICAL INTERFACE DURING THE TOUCH-SELECTION OF A DISPLAYED ELEMENT

(71) Applicant: RENAULT s.a.s., Boulogne-Billancourt (FR)

(72) Inventor: Stephane Regnier, Verrieres le Buisson (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 177 days.

(21) Appl. No.: 15/528,139

(22) PCT Filed: Nov. 19, 2015

(86) PCT No.: PCT/FR2015/053125
§ 371 (c)(1),
(2) Date: May 19, 2017

(87) PCT Pub. No.: WO2016/079432
PCT Pub. Date: May 26, 2016

(65) Prior Publication Data
US 2017/0308259 A1 Oct. 26, 2017

(30) Foreign Application Priority Data
Nov. 21, 2014 (FR) .................................... 14 61287

(51) Int. Cl.
*G06F 3/0488* (2013.01)
*G06F 3/0481* (2013.01)
(Continued)

(52) U.S. Cl.
CPC ............ *G06F 3/0488* (2013.01); *B60K 37/06* (2013.01); *G06F 3/0412* (2013.01);
(Continued)

(58) Field of Classification Search
CPC ............ B60K 2350/1028; B60K 37/06; G06F 3/0412; G06F 3/0416; G06F 3/0418; G06F 3/04812; G06F 3/04842; G06F 3/0488
See application file for complete search history.

(56) References Cited

U.S. PATENT DOCUMENTS

| 8,624,836 B1* | 1/2014 | Miller | ..................... G06F 1/163 345/157 |
| 2009/0201246 A1* | 8/2009 | Lee | ....................... G06F 1/1626 345/156 |

(Continued)

FOREIGN PATENT DOCUMENTS

| EP | 2105826 A2 | 9/2009 |
| FR | 3002052 A1 | 8/2014 |

OTHER PUBLICATIONS

International Search Report dated Mar. 9, 2016, in PCT/FR2015/053125, filed Nov. 19, 2015.

(Continued)

*Primary Examiner* — Viet D Pham
(74) *Attorney, Agent, or Firm* — Oblon, McClelland, Maier & Neustadt, L.L.P.

(57) ABSTRACT

A touch interface includes a display screen and detects an approach and a position of a user's finger with respect to the screen. The interface displays at least one first graphical element associated with a first touch selection zone and lying in a first region and at least one second graphical element superimposed on a second touch selection zone, and lying in a second region distinct from the first region. The interface estimates a trajectory of a point of the finger and a point of impact of the trajectory on the screen. The interface displaces, when the point of impact is detected in one of the regions, the graphical element of the region and the associated touch selection zone in the direction of the point of impact, and then, when the point of impact exits the region, restore the display of the graphical element to an initial state.

10 Claims, 4 Drawing Sheets

(51) Int. Cl.
*B60K 37/06* (2006.01)
*G06F 3/041* (2006.01)
*G06F 3/0484* (2013.01)

(52) U.S. Cl.
CPC .......... *G06F 3/0416* (2013.01); *G06F 3/0418* (2013.01); *G06F 3/04812* (2013.01); *G06F 3/04842* (2013.01); *B60K 2370/1438* (2019.05)

(56) References Cited

U.S. PATENT DOCUMENTS

| | | |
|---|---|---|
| 2009/0247233 A1 | 10/2009 | Kim |
| 2009/0247234 A1 | 10/2009 | Kim |
| 2011/0083089 A1* | 4/2011 | Pahud .................. G06F 3/0425 715/765 |
| 2011/0157040 A1* | 6/2011 | Kashio .................. G06F 3/0428 345/173 |
| 2011/0285665 A1 | 11/2011 | Matsumoto |
| 2012/0120002 A1 | 5/2012 | Ota |
| 2014/0028557 A1 | 1/2014 | Otake et al. |
| 2015/0123918 A1 | 5/2015 | Kim |
| 2016/0004348 A1 | 1/2016 | Roziere |
| 2016/0216837 A1* | 7/2016 | Nolan ..................... G06F 3/005 |

OTHER PUBLICATIONS

French Search Report dated Jul. 14, 2015, in French Patent Application No. 1461287, filed Nov. 21, 2014.

* cited by examiner

GRAPHICAL INTERFACE AND METHOD FOR MANAGING SAID GRAPHICAL INTERFACE DURING THE TOUCH-SELECTION OF A DISPLAYED ELEMENT

BACKGROUND

The subject of the invention is touch interfaces, in particular touch interfaces embedded on board automotive vehicles, or touch interfaces serving to control systems on which a user intervenes while being constrained to maintain his attention focused on other tasks, for example on the monitoring of a production machine.

In such configurations, the user must interact with the touch interface while keeping his attention predominantly available for tasks other than the actuation of the interface, and, if the interface is not very large, the user may experience difficulties in selecting the element of a menu. To select such an element of a menu, he must apply his finger at a given location of the interface corresponding to a zone of touch selection of the menu element, depicted on the screen by an icon or more generally a graphical symbol displayed on the screen substantially at the location of the touch selection zone. In particular, in an automotive vehicle, when the vehicle is in motion the selection gestures of the user, who must constantly monitor the road, may be imprecise.

In order to alleviate these drawbacks, certain manufacturers of mobile terminals have developed screens of large size or text input systems, in which for example a letter touched with the finger is graphically enlarged. This enlarged display, shifted away from the location where the icon to be activated and the finger are then situated, is maintained for a brief period of time, long enough however for the user to read the letter that he has input, thus performing a visual check to verify that he has performed the input that he desired. This type of display ever requires that the input be performed on a restricted and different zone of the screen with each new letter.

BRIEF SUMMARY

The aim of the invention is to propose a man/machine interface system making it possible to decrease the occurrences of errors when inputting the elements of a menu, by facilitating the graphical element input desired by the user, without necessarily increasing the size of the screen, and while leaving further margin in the gestures to be performed in order to perform the input.

To this end, the invention proposes a graphical interface or touch interface comprising a screen able to detect the approach and the position of a user's finger. Detection is preferably done inside a predefined volume, characterized in particular by a threshold distance of detection with respect to the screen. Detection is therefore done at least in a predefined volume, but could extend to a wider space. The interface is configured to display on the screen at least one first graphical element superimposed on a first touch selection zone and lying in a first region, and to display at least one second graphical element superimposed on a second touch selection zone, and lying in a second region of the screen distinct from the first region. The interface is configured to estimate a trajectory of a point of the finger and the point of impact of this trajectory on the screen, and is configured to, when the point of impact is detected in one of the regions or displacing inside one of these regions, displace the graphical element of this region and the associated touch selection zone, in the direction of the point of impact, and then, when the point of impact exits the region, restore the display of the graphical element to its initial state. The direction of displacement of the graphical element may be defined by the displacement of a particular point of the graphical element, which is referred to hereinafter in the description as anchoring point in its initial position, and as centering point once displaced.

Here, "screen" of the touch interface, or graphical interface, refers to three regions of two-dimensional space which are mutually superimposable, by means of a possible calculation of change of coordinates which is managed by an electronic control unit which manages the detection operations performed through the touch interface as well as the displays on the screen of the touch interface.

The first of these three regions consists of the display screen properly speaking making it possible to display the graphical elements for the attention of the user so as to indicate to him the regions of the space with which he should interact.

The second region is a unit for detection of the touch interface or graphical interface, associated with a sensitive plane surface of touchscreen type, superimposed on the display screen, or associated with another system for detection in space making it possible in particular to detect the position of the finger of the user in the vicinity of the display screen, then tagged in the coordinates specific to the detection interface.

The third region is defined by values of coordinates of points of a reference virtual screen, which values are stored by the electronic control unit and grouped by regions of the virtual screen, expressed in a system of coordinates specific to the electronic control unit. These regions of the virtual screen are for example defined by areal zones or by sets of boundary lines. The initial anchoring points of the graphical elements with respect to these regions are stored, and then their subsequent centering points are calculated, and the coordinates of the other points of each graphical element are also calculated at each instant and may thereafter be converted into the system of coordinates of the display screen. The position of the finger in the coordinates of the detection interface may be for example converted into the system of coordinates of the electronic control unit so as to identify its position with respect to the various boundaries, and then to calculate in the course of time the positions of the centering points of the displayed graphical elements, which are thereafter converted into positions on the display screen.

In a preferential manner, the first region is delimited by a first boundary, the second region is delimited by a second boundary which exhibits a boundary portion common with the first boundary. The graphical elements and the respective touch selection zones each surround in an initial state, the associated anchoring point, and then lie inside the region which is associated therewith. The boundaries of each region remain fixed during the display of a given selection menu, in the course of the interaction between the finger and the interface, until possibly a contact of the finger on the screen triggers the display of another selection menu.

The touch actuation finger may be the finger of an operator or may be an element detectable by the interface, for example an elongate object such as a stylus adapted to allow the detection of a particular geometric point by the touch interface.

Point of impact or point of contact is understood to mean the intersection of the trajectory estimated by the interface at a given instant, even if the finger does not touch the screen at this location at this moment nor later in the course of the interaction with the interface. The display of the translated graphical element at a given moment substitutes for the initial display of the graphical element and for the other previous displays, if there are any, of the graphical element.

When the point of impact is detected in the first region, the interface may be configured to calculate a translation vector between a first anchoring point belonging to the first undisplaced graphical element and a temporary point of centering of the first displaced graphical element, the centering point being a barycenter between the anchoring point and the point of impact, and to perform a corresponding translation of the first graphical element and of the associated touch selection zone, the relative distance between the centering point and the point of impact being calculated as an increasing function of the distance between the finger and the screen. Barycenter is here intended to mean a barycenter weighted between two points with weighting coefficients which may be variable functions, for example a function of the distance between the finger and the screen.

Temporary centering point is understood to mean a point of the screen on which the graphical element is centered during at least certain phases of interaction of the interface with the finger. Centering is understood here in the broad sense of the term, the centering point being able to be for example an areal barycenter, or a barycenter of certain characteristic points of the graphical element, the weighting coefficients of this barycenter being constant but not necessarily equal from one characteristic point to the other. The representation of the graphical element around the temporary centering point is then a homothety or else a bidirectional dilation of the initial representation of the graphical element around its anchoring point. In a preferred embodiment, the anchoring point and the temporary centering point are not apparent on the displayed graphical element. The ratio of the homothety or the ratios of the dilation are preferably greater than or equal to 1 as soon as the centering point no longer coincides with the initial anchoring point. The temporary centering point is situated between the anchoring point and the impact point. The point of anchoring of the graphical element is a particular point of the screen associated with this graphical element, preferably contained inside the boundaries of the graphical element for a reference display state of the interface. A reference display state corresponds for example to the display of a particular selection menu when no interaction with the finger is in progress.

The anchoring point may be typically a geometric barycenter of a surface or of a contour defining the visible boundaries of the graphical element. According to certain variant embodiments, the point of anchoring of the graphical element may however be off-centered with respect to the graphical element, for example may be shifted away from a geometric barycenter of the element, toward an edge of the screen whose graphical element is the closest, so as to limit the risks of overlap between the displaced graphical element and the edge of the screen.

Preferably, the function making it possible to calculate the relative distance between the centering point and the impact point vanishes when the finger touches the screen, that is to say when the distance between the finger and the screen vanishes. Stated otherwise, the ratio between the distance from the centering point to the point of impact and the distance between the anchoring point and the point of impact decreases as the finger approaches the screen, and vanishes when the finger touches the screen. According to a first variant embodiment, this ratio, stated otherwise this relative distance of approach does not depend on the distance between the point of impact and the anchoring point. According to another variant embodiment, this relative distance may be decreasing with the distance between the impact point and the anchoring point, for example if the graphical element is of reduced size compared with the distance separating two graphical elements. Thus the finger may be positioned above the graphical element even when the latter has been shifted remotely in proximity to the zone of influence of another graphical element. According to another variant embodiment, this relative distance may be increasing with the distance between the impact point and the anchoring point, for example if the graphical element is of size comparable with the distance separating two graphical elements. The "displaced" graphical element is thus precluded from encroaching unduly on the zones of influence of neighboring graphical elements.

The first region may be delimited by a first boundary and the second region may be delimited by a second boundary exhibiting a boundary portion common with the first boundary, and the interface may be configured to, when the point of impact crosses the common boundary portion from the first region to the second region, display at least temporarily both the first graphical element and the second graphical element away from their initial positions, respectively at a first intermediate position and at a second intermediate position between the initial position of the graphical element and the point of impact.

After the crossing of the common boundary portion, the interface may be configured to display the first graphical element at successive positions along a line meeting the first anchoring point, which are separated by first intervals whose length is a first increasing function of the distance of the point of impact from the common boundary portion.

The interface may be configured to calculate the first intervals with the aid of a first function which is furthermore an increasing function of the distance of the finger from the screen.

The interface may be configured to, after the crossing of the common boundary portion, furthermore display the second graphical element at successive positions along a line meeting the point of impact, which are separated by second intervals, each second-interval length being calculated on the basis of the first-interval length used for the display of the first graphical element at the same instant, by multiplying this first interval by a constant multiplier coefficient.

The constant multiplier coefficient may be less than the ratio between a first distance of the first anchoring point from the common boundary portion, and a second distance of the second anchoring point from the common boundary portion.

The multiplier coefficient may for example lie between 0.3 and 0.7 times the ratio between the first and the second distance. For example if the multiplier coefficient is equal to 0.5 times the ratio between the first and the second distance, then if the hesitant user stops his finger just after have crossed the common boundary portion, the first graphical element returns gradually to the first anchoring element, while the second graphical element approaches the point of impact. However, when the first graphical element reaches the first anchoring point, the second graphical element is situated only mid-way along a displacement toward the point of impact. If the user remains immobile beyond this instant of completed return of the first graphical element, the second graphical element may thereafter be displaced toward the point of impact to a distance from the second anchoring point which is calculated by a displacement vector dependent again on the distance of the second anchoring point from the point of impact, instead of being calculated in an incremental manner. The process triggered during the crossing of the common boundary portion by the point of impact, and symmetric depending on whether a displacement of the first graphical element or a displacement of the second graphical element was triggered first.

The interface may be configured to, as long as a graphical element is displayed away from its initial position, display the translated graphical element by dilating this graphical element, in at least one direction, by an enlargement factor. The dilation may correspond to a bidirectional homothety, but may, in certain variant embodiments, correspond to a dilation with two different ratios along two perpendicular axes of the screen or else to a unidirectional dilation. For example if the graphical element lies near a display edge of the screen, the graphical element may be further dilated, or dilated solely in the direction perpendicular to this edge, so as to delay the moment when the graphical element overlaps the edge of the screen if the finger approaches this edge. The enlargement factor, that is to say the ratio of the homothety or the highest ratio of the bidirectional dilation, is preferably between 1.1 and 1.5, and preferably between 1.15 and 1.35. The graphical element may alternatively, or as a supplement to the change of dimension, be accentuated by a change of brightness, of contrast, of color, of filling pattern, of evolution of the graphism evoking a bringing closer or a placing in relief of the graphical element.

The interface may be configured to permit at least sometimes a selection by contact of the finger at a point in the first touch selection zone, whilst the first touch selection zone temporarily overlaps the second region and whilst this point lies in the second region.

The invention furthermore proposes a method for managing a touch interface able to detect the approach and the position of a user with respect to a screen of the interface, in which:
  there is displayed in a first step on the screen at least one first graphical element associated with a first touch selection zone, both of them surrounding a first point of anchoring of the graphical element on the screen, and lying inside one and the same first region;
  there is displayed in this first step on the screen at least one second graphical element associated with a second touch selection zone, both of them surrounding a second point of anchoring of the graphical element on the screen, and lying inside one and the same second region;
  a trajectory of a point of the finger and the point of impact of this trajectory on the screen are estimated in a repeated manner,
  when the point of impact enters the first region, the graphical element displayed and the associated touch selection zone are displaced in the direction of the point of impact;
  if the point of impact crosses a common boundary portion between the first and the second region, the display of the first graphical element is brought back incrementally toward the first anchoring point, while the second graphical element is brought incrementally closer to the point of impact.

The invention may of course be applied to modes of selection by position of the finger on a reconfigurable display zone, even if the selection is not done in a touch manner within the prime meaning of the term: it may for example be applied to a menu projected temporarily by optical means for example on a surface of an automotive vehicle windshield, the interface comprising means for analyzing the position of the actuation finger for example on the basis of inputs from cameras positioned in proximity to the surface.

BRIEF DESCRIPTION OF THE DRAWINGS

Other aims, characteristics and advantages of the invention will become apparent on reading the following description, given solely by way of nonlimiting example and with reference to the appended drawings in which.

Figure 1:
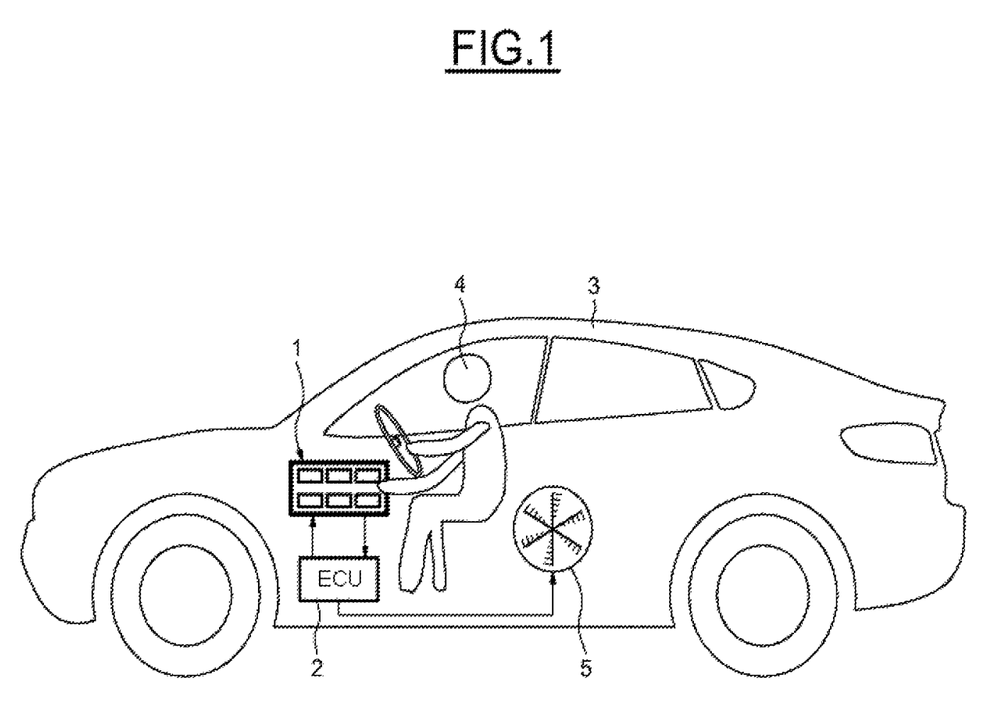
FIG. 1 illustrates an automotive vehicle equipped with an interface according to the invention.

As illustrated in FIG. 1, a touch interface 1 according to the invention may be for example embedded on board an automotive vehicle 3 controlled by a user 4 who, by displacing his finger and by touching certain points of a screen of a touch interface 1, is thus able to send setpoints to an electronic control unit 2 making it possible to actuate various items of equipment of the vehicle, for example an aeration system 5 of the vehicle or any other item of equipment of the vehicle.

DETAILED DESCRIPTION

The electronic control unit 2 may also return messages to the touch interface 1 that convey the operating state of the vehicle 3 so that the user 4 of the vehicle may take these data into account.

Figure 2:
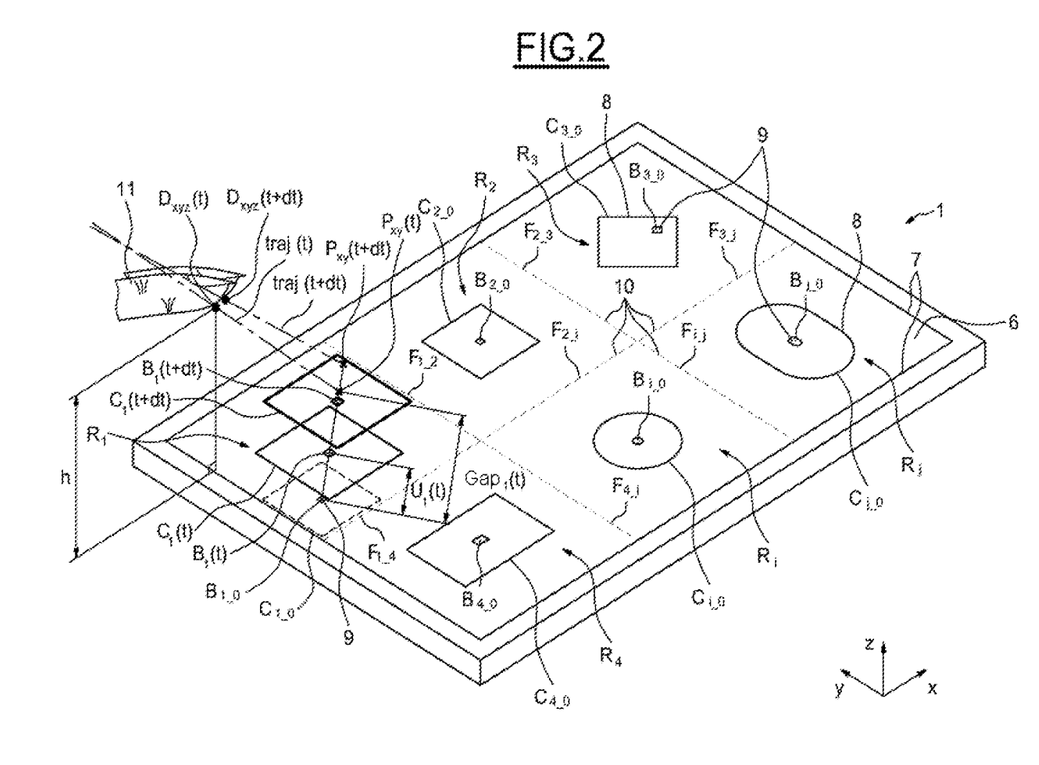
FIG. 2 illustrates a man-machine interface according to the invention.

FIG. 2 illustrates the operating principle of a touch interface 1 according to the invention. The touch interface 1 typically comprises a touchscreen 6, delimited by edges 7 and a detection system (not represented) making it possible to detect the position in a three-dimensional space of a finger 11 of a user in particular of a particular point $D_{xyz}$ of this finger, and making it possible to detect whether or not this finger is in contact with the touchscreen 6. Here, touchscreen refers to any system for input by displacement of a finger and by the approaching of this finger to a validation surface. The invention may for example be applied to detection systems which optically project information onto an inert surface and observe the volume neighboring this surface by means of diverse sensors, optical or infrared for example, so as to detect the position of a finger and so as to detect whether the finger is or is not in contact with the surface.

A reference virtual screen, whose representation is superimposed here on that of the touchscreen 6, is typically delimited by means of boundaries 10 designated here by $F_{1\_4}$, $F_{1\_2}$, $F_{4\_i}$, $F_{2\_i}$, $F_{2\_3}$, $F_{i\_j}$, $F_{3\_j}$ in regions or zones of influence, which are referenced $R_1$, $R_2$, $R_3$, $R_4$, $R_i$ and $R_j$ in FIG. 2. Each region corresponds to a zone of selection of a menu displayed on the virtual screen corresponding to the touchscreen 6. The regions liable to give rise to an act of validation each display a graphical element designated by the general reference 8, and more particularly referenced according to the regions $C_{1\_0}$, $C_{2\_0}$, $C_{3\_0}$, $C_{4\_0}$, $C_{i\_o}$, $C_{j\_0}$.

These graphical elements whose second index is "0" correspond to an initial display of the menu on the touchscreen 6. The graphical interface detection system is configured to detect the motion of the finger 11 and in particular of an end $D_{xyz}$ of this finger which at an instant t lies at the point $D_{xyz}(t)$ and at the following instant t+dt lies at a point $D_{xyz}(t+dt)$.

The electronic control unit 2 of the graphical interface is able to determine, for example by extrapolation of the successive points detected, a trajectory which is re-estimated at each instant and which is denoted traj(t) in FIG. 2 for the trajectory estimated at the instant t, and which is denoted traj(t+dt) for the trajectory estimated at the instant t+dt. Each of these calculated trajectories defines a point $P_{xy}$ which is referred to here as point of impact or point of contact, although the contact or the impact firstly remains theoretical, the point of contact being a point calculated as being the probable target of the user. The point of contact $P_{xy}$ is in reality the intersection of the trajectory and of a contact surface of the screen which may coincide with the display surface of the screen 6.

The invention proposes, when the point of impact lies at a distance of less than a threshold distance from one of the graphical elements $C_{1\_0}$, $C_{2\_0}$, $C_{3\_0}$, $C_{4\_0}$, $C_{i\_0}$, $C_{j\_0}$, to modify the display of the graphical element and to bring the graphical element closer to the point of impact, so as to aid the user who may thus continue to validate the corresponding option of the menu without shifting his finger away from the trajectory in progress. Accordingly, for each graphical element to be displayed, a virtual anchoring point 9 is arbitrarily defined in the coordinates of the virtual screen, this anchoring point serving both to estimate the distance between the graphical element and the point of impact and to calculate the subsequent displacements of the display of the graphical element.

In FIG. 2, these anchoring points 9 are tagged respectively by the references $B_{1\_0}$, for the graphical element $C_{1\_0}$, $B_{2\_0}$ for the graphical element $C_{2\_0}$, ... $B_{j\_0}$ for the graphical element $C_{j\_0}$.

These anchoring points may for convenience correspond to an areal barycenter of the graphical element, or to a barycenter of a contour of the graphical element. According to a variant embodiment, they may optionally be situated in an arbitrary manner near one of the boundaries of the graphical element.

To determine whether the display of the graphical element $C_{1\_0}$, should be displaced, the distance $Gap_1(t)$, may be compared either with a constant threshold, or with a threshold which depends on the direction of the straight line connecting the anchoring point $B_{1\_0}$ and the point of contact $P_{xy}(t)$. For example, it is possible to verify whether the point of contact lies inside the boundaries delimiting the region in which the graphical element considered lies in its initial state when there is no interaction with the finger.

In FIG. 2, the distance at an instant t, of the point of contact $P_{xy}(t)$ from the trajectory traj(t) calculated at this instant t, and from the anchoring point $B_{1\_0}$ is denoted $Gap_1(t)$. As a function of this distance $Gap_1(t)$, and optionally as a function of the distance of the finger from the screen, a displacement, denoted here $U_1(t)$, which at a given instant corresponds to a vector joining the anchoring point $B_{1\_0}$ and a temporary centering point $B_1(t)$, is applied to the graphical element $C_{1\_0}$. The temporary centering point $B_1(t)$ occupies, with respect to the displaced graphical element $C_1(t)$, the same barycentric position as the anchoring point $B_{1\_0}$ occupies initially with respect to the graphical element $C_{1\_0}$ in its initial display configuration.

At a later instant t+dt, the re-calculated trajectory defines a new point of impact $P_{xy}(t+dt)$ whose position is used jointly with the distance of the finger from the screen to calculate a new position of the centering point $B_1(t+dt)$ of the graphical element $C_1(t+dt)$ displayed at that moment.

In order to improve the user's perception of the graphical element which is on the point of being selected, it is possible, as soon as the displacement of the display of the graphical element is activated, to accompany this displacement with a dilation of the dimensions of the graphical element, for example a homothety in all the directions or optionally, according to the space available on the screen, a dilation according to one of the directions of the screen.

The size of the graphical element may thereafter be kept constant as long as the displacement of the display of the graphical element continues to be effective.

According to the size of the graphical element and the amplitude of the displacement $U_1(t)$, it may happen that the graphical element overlaps one of the boundaries between regions. For example in FIG. 2, the graphical element $C_1(t+dt)$ is on the point of overlapping the boundary $F_{1\_2}$. With each graphical element is associated a touch selection zone, which when it is touched by the user's finger triggers an action corresponding to one of the options of the menu which is displayed on the screen. Preferably, the touch selection zone coincides with the surface occupied by the graphical element.

The interface according to the invention may be configured so that, if subsequent to the trajectory traj(t) performed by the finger, the graphical element and the associated touch selection zone overlap one of the boundaries and that the finger arrives in contact with the screen at a point of the graphical element displayed at this instant, a validation on the associated touch selection zone is then taken into account, even if at this instant the point of contact lies beyond the boundary of the region associated with the graphical element.

In this way, the user's input is facilitated, since the effective boundary of the region sanctioned for selecting an element of the menu deforms as it were to a certain extent as a function of the trajectory of the user's finger, so as to widen the total selection region sanctioned by temporarily displacing its boundaries.

Figure 3:
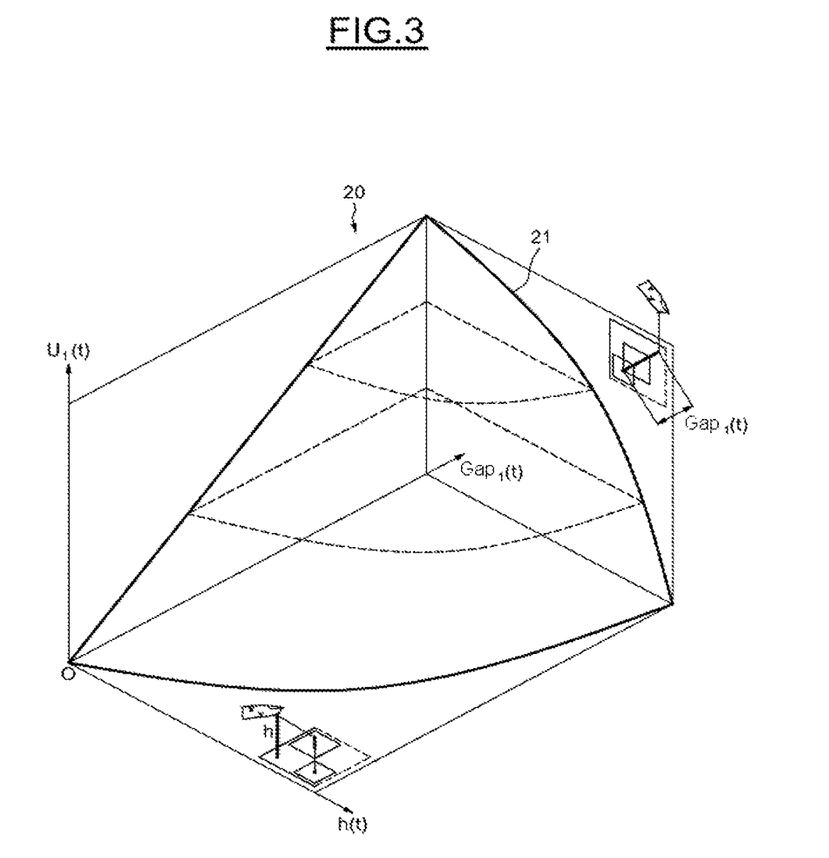
FIG. 3 is a graph characteristic of one of the modes of operation of the interface of FIG. 2.

FIG. 3 illustrates an exemplary graphic 20 connecting the amplitude of the displacement here denoted $U_1(t)$ of a graphical element on an interface according to the invention, as a function of a distance h(t) between a finger of the user and the screen, and of a distance $Gap_1(t)$ between the point of impact of the trajectory of the finger and the initial point of anchoring of the graphical element.

The mapped surface 21 is chosen here so as to cancel any displacement of the graphical element when the distance of the finger from the screen exceeds a certain threshold $h_0$, which may typically be the threshold distance of detection of the touch interface. The mapped surface 21 is also chosen so as to cancel any displacement of the graphical element when the point of impact approaches the anchoring point, since there is then no longer any reason to displace the graphical element.

Typically, the value $U_1(t)$ of displacement may be chosen as a product of the distance $Gap_1(t)$ and a function which is chosen as an increasing function of the distance of the finger from the screen, which function vanishes for a distance threshold value $h_0$. One of the possible forms of functions for defining the displacement vector $U_1(t)$ is to multiply the distance $Gap_1(t)$ directly by a concave or convex function of the distance h of the finger from the screen. This concave or convex function may be for example a power of the difference between 1 and a ratio of the distance h of the finger to the threshold distance $h_0$.

If a power a is chosen for this function, the expression proposed in equation (1) and corresponding to the graphic of FIG. 3 is obtained:

$$U_1(t) = Dist(B_{1\_0}, P_{xy}(t)) \times \sqrt{(1 - h(t)/h_0)} = \text{Gap}_1(t) \times \sqrt{(1 - h(t)/h_0)} \quad \text{Equation (1)}$$

The advantage of choosing a convex function form such as this is that there is a "slowing" effect of the displacement of the graphical element when the finger is in the immediate vicinity of the screen, thereby avoiding disturbing the user before the final selection. It is possible to envisage another variant function U(t) in which a power function is also applied to the distance $\text{Gap}_1(t)$ between the anchoring point and the point of impact, so as for example to slow the displacement of the graphical element when approaching bounds of the region associated with the graphical element considered. The distance of the finger from the screen may be taken as an orthogonal distance h from the finger to the screen, as represented in FIGS. 2 and 3. According to a variant embodiment, not represented, the distance from the finger to the screen is taken as the distance between the point $D_{xyz}$ of the finger closest to the screen and the point of impact $P_{xy}(t)$ of the trajectory at this instant.

According to another variant, it is possible to define a relative distance between the centering point $B_1(t)$ of the graphical element, and the point of impact $P_{xy}(t)$ as a distance ratio $\Delta_1(t)$, defined as:

$$\Delta_1(t) = \frac{\text{Gap}_1(t) - U_1(t)}{\text{Gap}_1(t)}. \quad \text{Equation (2)}$$

This relative distance gives the gap remaining to be traversed to the graphical element in order that this graphical element is centered on the point of impact.

This relative distance decreases as the finger approaches the screen and vanishes when the finger touches the screen.

When the graphical element eventually overlaps the boundary of one of the regions, two assumptions have to be envisaged. In a first case, the validation and the menu element corresponding to the graphical element, occurs whilst the displaced displayed graphical element still lies entirely in the region which is associated therewith.

The interface then generally toggles to a new display screen so as to confirm the selection, or to propose another menu.

It is also possible for the user's finger to continue to steer toward the boundary region, either due to the vagaries of motion of the vehicle, or because, on account of an insufficiently precise selection, it is the graphical element situated on the other side of the boundary region that the user in fact wishes to actuate. The invention then proposes a transition display expedient making it possible to indicate to the user that he is in a boundary zone between two validations and to allow him to immediately view which graphical element is the one that is currently being abandoned for the selection, and which graphical element is the one that is being brought to the fore in regard to the trajectory of the user's finger.

Figure 4:
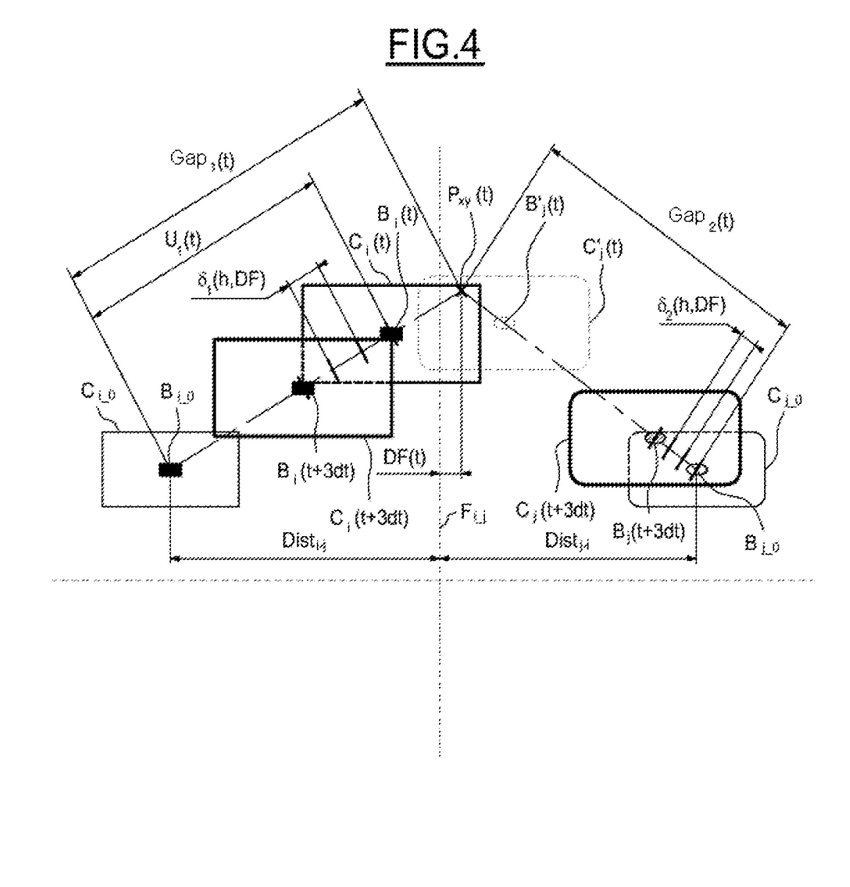
FIG. 4 illustrates a portion of the interface of FIG. 2 during a particular selection by the user of the interface.

FIG. 4 illustrates a particular example in which the user has initially engaged the displacement of the display of a graphical element $C_i$ that has approached a boundary $F_{i\_j}$ between a region i and a region j of the screen 6 of the interface 1 illustrated in FIG. 2. Subsequent to the displacement performed by the user's finger, the point of impact $P_{xy}(t)$ which initially lay in the region i, has passed into the region j, and lies at a distance denoted here DF(t) from the boundary $F_{i\_j}$ between the two regions.

The point of impact $P_{xy}(t)$ lies at a distance denoted here $\text{Gap}_1(t)$ from the anchoring point $B_{i\_0}$ of the graphical element $C_i$ of the region i and lies at a distance $\text{Gap}_2(t)$ from the anchoring point $B_{j\_0}$ of the graphical element $C_j$ associated with the region j.

At the instant t, the graphical element $C_i(t)$ already overlaps the boundary $F_{i\_j}$ and the graphical element $C_j$ is still in its initial configuration $C_{j\_0}$, since the theoretical point of impact of the finger has only just crossed the boundary $F_{i\_j}$. Once the crossing of the boundary has been detected by the interface 1, the latter activates a progressive and simultaneous displacement of the two graphical elements of the regions $R_i$ and $R_j$ in such a way as to restore the graphical element of the region $R_i$ to its initial position—in the absence of interaction—, and to begin to displace the graphical element of the region $R_j$ in the direction of the point of impact $P_{xy}(t)$. In the instants which follow, the graphical element $C_i$ is on each occasion displaced along the line which connects the impact element $P_{xy}$ and the anchoring point $B_{i\_0}$, by a first interval $\delta_1$ which is dependent on the distance h of the finger from the screen and is dependent on the distance DF of the point of impact $P_{xy}(t)$ from the boundary $F_{i\_j}$. At the same time, the graphical element $C_j$ is displaced along the line which connects the anchoring point $B_{j\_0}$ to the point of impact $P_{xy}$, by a second interval $\delta_2$, which is also dependent on the distance h of the finger from the screen and on the distance DF between the point of impact and the common boundary.

The values of the intervals $\delta_1$ and $\delta_2$ are chosen in such a way that, if the hesitant user keeps his finger planted in the position $P_{xy}$ detected after the crossing of the boundary, then the graphical element $C_i$ returns to its initial position, and the graphical element $C_j$ has in the same time traversed a portion of the distance which separates it from the point of impact. The user then sees that the graphical element $C_j$ is selected with a view to its activation since he has initiated its displacement.

To obtain this effect, it is for example possible to calculate the values of the intervals $\delta_1$ as values proportional to a first function of the distance of the finger from the screen. This first function vanishes for the screen detection threshold, and is increasing as a function of the distance of the finger from the screen. In one embodiment, it is possible to introduce furthermore a constant ratio between the first interval $\delta_1$—displacement of the graphical element in the course of deselection— and the second interval $\delta_2$—displacement of the graphical element in the course of preselection. This ratio may be for example dependent on the distances between the respective anchoring points of the graphical elements and the point of impact stated otherwise a ratio which is equal to the ratio between the distances of the respective anchoring points and the common boundary $F_{i\_j}$.

Thus, $\text{Dist}_{i\_j}$ denotes the distance of the point of anchoring of the first graphical element from the common boundary, and $\text{Dist}_{j\_i}$ the distance of the point of anchoring of the second graphical element from the common boundary, it is possible to use expressions of the type:

$$\delta_1(h, DF) = \delta i(h, DF) = K \frac{DF(t)}{\text{Dist}_{i\_j}} \times \sqrt{(1 - h(t)/h_0)} \quad \text{Equation (3)}$$

-continued $$\delta_2(h, DF) = \delta j(h, DF) = k \frac{DF(t)}{Dist_{j\_i}} \times \sqrt{(1 - h(t)/h_0)} \quad \text{Equation (4)}$$

Preferably with: k/K≤1

The values k and K are constant coefficients, which are chosen in such a way that the ratio k/K is less than 1, for example equal to ½. In this way, when the first graphical element $C_i$ has returned to its initial position $C_{i\_0}$, the second graphical element $C_j$ will lie mid-way between its initial position $C_{j\_0}$ and the point of impact $P_{xy}$.

Represented in the example illustrated in FIG. 4 are the positions of the graphical elements $C_i$ and $C_j$, and their displacements over three time intervals of amplitude dt, after an instant t at which the boundary has been crossed by the point of impact $P_{xy}$. It is thus seen that the graphical element $C_i(t+3dt)$ has performed three steps backward, of value $\delta_1$ in the direction of its initial position, whilst the graphical element $C_j$ has performed three steps forward of amplitude $\delta_2$ in the direction of the point of impact $P_{xy}$. The amplitude of the step $\delta_1$ is greater than the amplitude of the step $\delta_2$ since the distances to the common boundary $F_{i\_j}$ of the anchoring points $B_{i\_0}$ and $B_{j\_0}$ are comparable.

By way of illustration of another embodiment, FIG. 4 also shows a graphical element position $C'_j(t)$ which could correspond to the position of the graphical element $C_j$ if a particular procedure were not provided for upon crossing the boundary $F_{i\_j}$. This theoretical position is calculated according to the same scheme as for the displayed position of the graphical element $C_i$ on the other side of the boundary. In the absence of any transient display procedure upon boundary crossings, the two elements would both lie very close to the same point $P_{xy}$, which could lead to a confusion in the perception of the user, who would have difficulties in knowing which graphical element is the previously selected one and which is the one that has just been activated. The procedure for progressive erasure of the element activated according to the invention makes it possible to improve the perception of the chronology of the elements selected by the user.

By convention, the distance between the point of impact and the graphical element is measured as the distance between the point of impact and a centering point obtained by applying the graphical element's translation vector to the initial centering point.

The relation between the proximity of the finger to the screen and the proximity between the point of impact and the displaced equivalent of the anchoring point is not necessarily linear.

The invention is not limited to the exemplary embodiments described and may be particularized in numerous variants. The position of the finger with respect to the interface may be detected by any touch means or any means of selection by positioning of the end of a finger. The functions making it possible to calculate the displacement of a graphical element may differ from those cited in the examples. Timeouts may be introduced at certain steps of the process of modified display of the graphical element or elements. Modes of transparency display of one graphical element with respect to another may be provided for if two graphical elements must be displayed on zones intercepting.

The invention claimed is:

1. A touch interface comprising:
a display screen, the interface being able to detect an approach of a finger of a user toward the screen and a position of the finger of the user with respect to the screen when the finger is not in contact with the screen, the interface being configured to display on the screen at least one first graphical element associated with a first touch selection zone and lying in a first region, and to display at least one second graphical element superimposed on a second touch selection zone, and lying in a second region of the screen distinct from the first region, the interface being configured to estimate, when the finger is not in contact with the screen, a trajectory of a point of the finger toward the screen and a point of impact of the trajectory on the screen, and the interface is configured to, when the point of impact is detected in one of the regions, displace the graphical element of the region and the associated touch selection zone in a direction of the point of impact, and then, when the point of impact exits the region, restore the display of the graphical element to an initial state.

2. The touch interface as claimed in claim 1, in which the interface is configured to, when the point of impact enters the first region, calculate a translation vector between a first anchoring point belonging to the first graphical element when the first graphical element is undisplaced, and a temporary centering point of the first graphical element when the first graphical element is displaced, the centering point forming barycenter between the first anchoring point and the point of impact, and to perform a corresponding translation of the first graphical element and of the associated touch selection zone, a relative distance between the centering point and the point of impact being calculated as an increasing function of a distance between the finger and the screen.

3. The touch interface as claimed in claim 2, in which the first region is delimited by a first boundary and the second region is delimited by a second boundary exhibiting a common boundary portion with the first boundary, the interface being configured to, when the point of impact crosses the common boundary portion from the first region to the second region, display at least temporarily both the first graphical element and the second graphical element away from their initial positions, respectively at a first intermediate position and at a second intermediate position between the initial position of the graphical element and the point of impact.

4. The touch interface as claimed in claim 3, in which the interface is configured to, after the crossing of the common boundary portion, display the first graphical element at successive positions along a line meeting the first anchoring point, which are separated by first intervals whose length is a first increasing function of the distance of the point of impact from the common boundary portion.

5. The touch interface as claimed in claim 4, in which the interface is configured to calculate the first intervals with the aid of a first function which is furthermore the increasing function of the distance of the finger from the screen.

6. The touch interface as claimed in claim 5, in which the interface is configured to, after the crossing of the common boundary portion, furthermore display the second graphical element at successive positions along a line meeting the point of impact, which are separated by second intervals, each second-interval length being calculated on the basis of the first-interval length used for the display of the first graphical element at the same instant, by multiplying this first interval by a constant multiplier coefficient.

7. The interface as claimed in claim 6, in which the constant multiplier coefficient is less than a ratio between a first distance of the first anchoring point from the common boundary portion, and a second distance of a second anchoring point from the common boundary portion.

8. The touch interface as claimed in claim 1, in which the interface is configured, as long as a graphical element is displayed away from an initial position, to display a translated graphical element by dilating the graphical element, in at least one direction, by an enlargement factor.

9. The interface as claimed in claim 1, in which the interface is configured to permit at least sometimes a selection by contact of the finger at a point lying in the first touch selection zone, while the first touch selection zone temporarily overlaps the second region and while the point lies in the second region.

10. A method for managing a touch interface able to detect an approach and a position of a finger of a user with respect to a screen of the interface, comprising:

displaying in a first step on the screen at least one first graphical element associated with a first touch selection zone, surrounding a first anchoring point of the first graphical element on the screen, and lying inside a first region;

displaying in the first step on the screen at least one second graphical element associated with a second touch selection zone, surrounding a second anchoring point of the second graphical element on the screen, and lying inside a second region;

estimating, when the finger is not in contact with the screen, a trajectory of a point of the finger toward the screen and a point of impact of the trajectory on the screen in a repeated manner, displacing, when the point of impact enters the first region, the first graphical element displayed and the associated touch selection zone in a direction of the point of impact; and bringing, when the point of impact crosses a common boundary portion between the first and the second regions, the display of the first graphical element back incrementally toward the first anchoring point, while the second graphical element is brought incrementally closer to the point of impact.

* * * * *